United States Patent
Guerreiro et al.

(10) Patent No.: US 8,813,603 B2
(45) Date of Patent: Aug. 26, 2014

(54) CRANK DRIVE

(75) Inventors: Sergio Stefano Guerreiro, Sorocaba (BR); Luis Antonio Fonseca Galli, Campinas (BR); Walter Tavares De Oliveira, Jarinú (BR); Alex De Souza Rodrigues, Jarinú (BR)

(73) Assignee: Thyssenkrupp Metalurgica Campo Limpo Ltda, Campo Limpo Paulista-SP (BR)

( * ) Notice: Subject to any disclaimer, the term of this patent is extended or adjusted under 35 U.S.C. 154(b) by 446 days.

(21) Appl. No.: 12/596,187

(22) PCT Filed: Apr. 17, 2008

(86) PCT No.: PCT/IB2008/000943
§ 371 (c)(1),
(2), (4) Date: Dec. 4, 2009

(87) PCT Pub. No.: WO2008/129395
PCT Pub. Date: Oct. 30, 2008

(65) Prior Publication Data
US 2010/0083791 A1    Apr. 8, 2010

(30) Foreign Application Priority Data

Apr. 19, 2007  (DE) .......................... 10 2007 018 434
Sep. 26, 2007  (EP) ..................................... 07018896

(51) Int. Cl.
*F16C 3/06*    (2006.01)
*F16C 7/02*    (2006.01)
*F16C 9/04*    (2006.01)
*F16C 9/02*    (2006.01)

(52) U.S. Cl.
CPC . *F16C 9/04* (2013.01); *F16C 7/023* (2013.01); *F16C 3/06* (2013.01); *F16C 9/02* (2013.01)
USPC .......................................... 74/595; 74/579 E

(58) Field of Classification Search
CPC ................ F16C 3/04; F16C 3/06; F16C 9/02; F16C 9/04
USPC ........ 74/595, 596, 597–605, 579 E; 384/294, 384/429, 430; 123/197.4; 29/888.08
IPC ................................................. F16C 3/06, 3/08
See application file for complete search history.

(56) References Cited

U.S. PATENT DOCUMENTS 1,329,811 A  *  2/1920  Smith ......................... 60/605.1
1,451,608 A  *  4/1923  Bell ............................... 74/605

(Continued)

FOREIGN PATENT DOCUMENTS

DE    2947699    7/1981
DE    4034808    5/1991

(Continued)

*Primary Examiner* — Thomas Diaz
(74) *Attorney, Agent, or Firm* — Andrew Wilford

(57) ABSTRACT

A crank drive has a crankshaft having at least one crank pin having a bearing surface with a concavely curved shape in a longitudinal crankshaft section and a conrod having a big end fitted to the crank pin and having a bearing surface with a convex shape in contact with the concave shape of the bearing surface of the crank pin in a load-bearing area that transmits forces acting between the big end of the conrod and the crank pin when the drive is in use. The shapes of the bearing surfaces are in accordance with the principle of uniformly distributed stresses such that essentially the same equivalent stress is distributed overall in the bearing surfaces in time average.

8 Claims, 7 Drawing Sheets

(56) References Cited

U.S. PATENT DOCUMENTS

Figure 1:
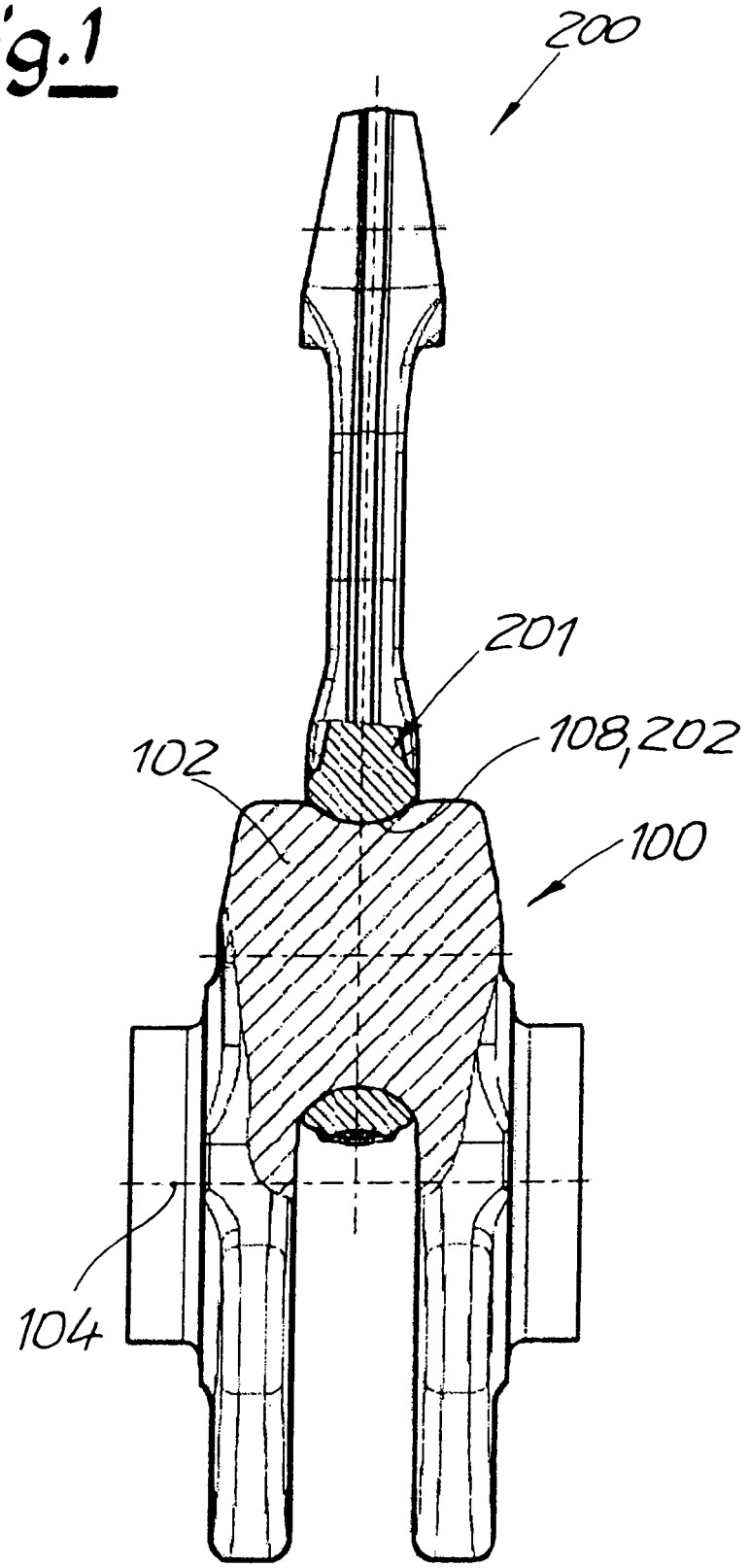

| | | | |
|---|---|---|---|
| 1,716,062 A * | 6/1929 | Johnson | 384/216 |
| 1,875,682 A * | 9/1932 | Walker | 74/596 |
| 1,931,231 A * | 10/1933 | Luker | 384/216 |
| 2,065,509 A | 10/1934 | Bell et al. | 74/579 |
| 2,419,274 A * | 4/1947 | McDowall et al. | 74/603 |
| 3,411,380 A | 11/1968 | Ehl et al. | 74/595 |
| 4,015,485 A * | 4/1977 | Ganter-Ullmann et al. | 74/596 |
| 4,256,741 A | 3/1981 | Stach | 74/595 |
| 4,356,741 A * | 11/1982 | Schopf et al. | 74/595 |
| 4,456,313 A * | 6/1984 | Hartnett et al. | 384/565 |
| 5,009,001 A * | 4/1991 | Deschler | 29/888.08 |
| 6,120,187 A | 9/2000 | Ono et al. | 384/273 |

FOREIGN PATENT DOCUMENTS

| | | |
|---|---|---|
| DE | 10130253 | 1/2003 |
| GB | 230020 | 8/1925 |

* cited by examiner

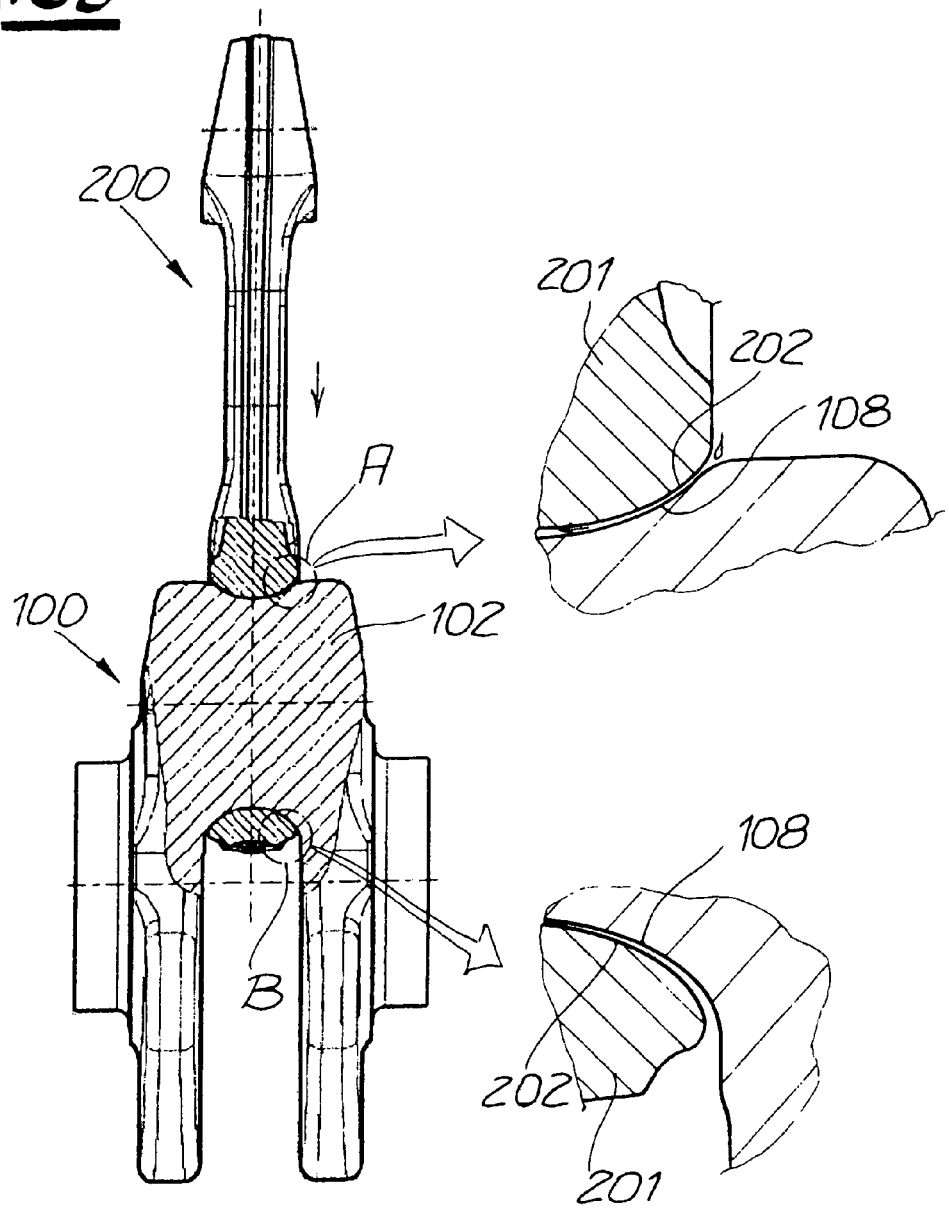

CRANK DRIVE

CROSS REFERENCE TO RELATED APPLICATIONS

This application is the US national phase of PCT application PCT/IB2008/000943, filed 17 Apr. 2008, published 30 Oct. 2008 as WO2008/129395, and claiming the priority of German patent application 102007018434.6 itself filed 19 Apr. 2007 and European patent application 07018896.6 itself filed 26 Sep. 2007, whose entire disclosures are herewith incorporated by reference.

The invention relates to a crank drive comprising a crankshaft and at least one conrod, wherein the conrod comprises a big end mounted on a crank pin of the crankshaft. The crank pin and the big end of the conrod comprise bearing surfaces which are in close contact to one another in a load-bearing area that bears the forces acting between the big end of the conrod and the crank pin when the device is operated.

The word "conrod" is a common abbreviation for "connecting rod".

In the prior art the bearing surfaces of the crank pin and the big end of the conrod a formed cylindrically. Mostly the cylindrical bearing surface of the crank pin adjoins the webs of the crankshaft that connect the crank pin with main journals with an undercut formed as a fillet (U.S. Pat. No. 4,356,741). Around the fillets, high localized stresses occur in loading case. From DE 29 47 699 C2 it is common to form transitions with tangent radii between the journals and the webs. The radii have dimensions of a few millimeters and do not belong to the load-bearing surface that bears the forces acting on the crankshaft. Due to reasons of material strength, it is common to strain harden the surface of the crankshaft by means of cold rolling (deep rolling).

With this background, the object of the invention is to optimise the contour of the bearing surfaces of the crank pin and the big end of the conrod in a mariner suitable for loading and through suitable formation to improve the fatigue strength of the crankshaft and the lifetime of the device and to keep the production process simple.

The object of the invention is achieved in that the bearing surfaces of the crank pin in its load-bearing area features a concave curved profile in the longitudinal shaft section and that the bearing surface of the big end of the conrod features a convex profile being in close contact to the concave profile of the crank pin. A large contact surface area between the crank pin and the big end of the conrod is achieved so that a low contact pressure between the parts results. The convex profiled big end of the conrod causes a mass reduction of the big end region of the conrod. Furthermore the curved profiles of the bearing surfaces allow an effective lubrication of the bearing surfaces because operating displacements and for elastic deformations of the crank drive result in an oil pump effect between the cooperating convex and concave bearing surfaces.

A crankshaft for the device is subject of claim 2. The crankshaft comprises main journals, crank pins and webs that connect the crank pins with the main journals. The main journals define the axis of rotation of the shaft. The crank pins comprise a bearing surface for a conrod and the main journals comprise a bearing surface for accommodation in an engine block bearing. The crankshaft is made as a single piece by forging or casting. According to the invention the bearing surface of the crank pins in its loading area that bears the forces acting on the crankshaft features a concave profile in the longitudinal shaft section. The profile is preferable determined according to the principle of uniform distributed stresses such that the same equivalent stress is distributed overall on the bearing surface in time average, i.e. in average over one complete engine firing cycle. Equivalent stress according to von-Mises is used as basis, for instance. The principle of constant stresses leads to an increase of material in highly loaded areas and material reduction at weakly loaded areas. Through this, the strength of the component part and its durability are increased. The design optimisation according to the principle of constant stresses, which leads to the profile of bearing surfaces according to the invention, can be achieved according to a method developed by Claus Mattheck, according to the Finite Elements Method or with an approximation method (Claus Mattheck; "Design in Nature", $4^{th}$ Edition (2006), Rombach Verlag).

According to a preferred embodiment of the invention the bearing surfaces of the main journals also comprise a concave profile in the longitudinal shaft section in their load-bearing area that bears the forces acting on the crankshaft.

The load-bearing area of the bearing surfaces of the crankshaft preferably adjoins on both sides with a continuous curvature on a starting point of the webs. The profile is continuously curved and formed symmetrically to the middle of the bearing surface. The symmetrical sections of the profiles deviate from the circular shape and can be described by means of a polynomial function of higher order.

The bearing surfaces of the main journals and crank pins feature convenient profiles that are optimised independent of one another and feature different curvatures as an optimisation result.

A conrod for a device according to the invention comprises a big end for accommodation on a crank pin of the crankshaft. The big end comprises a bearing surface with a load-bearing area that bears the forces acting on the big end of the conrod. The bearing surface of the conrod is matched to the profile of the bearing surface of the crank pin and features a convex profile in the longitudinal shaft section in its load-bearing area. The bearing surface can also be formed by a bearing shell accommodated in the bore of the big end of the conrod. The engine block bearings for the crankshaft are also accordingly matched to the profile of the main journals.

The invention will be described below by means of preferred embodiments. The accompanying drawings show schematically in FIG. 1 a crank drive according to the invention, FIG. 2 a longitudinal section of a crankshaft according to the invention, FIG. 3 a part of the crankshaft according to the invention with a greater detail, FIG. 4 a prior art crankshaft with a detail for comparison, FIG. 5 a part of the prior art crank drive, FIG. 6a, 6b the improvement of lubrication based on an oil pump effect when the crank drive is operated.

The device illustrated in FIG. 1 comprises a crankshaft 100 and at least one conrod 200 having a big end 201 mounted on a crank pin 102 of the crankshaft. The crank pin 102 and the big end 201 of the conrod 200 comprise bearing surfaces 108, 202 which are in close contact to one another in a load-bearing area that bears the forces acting between the big end 201 of the conrod and the crank pink 102 when the device is operated. The bearing surface 108 of the crank pin 102 in its load-bearing area features a concavely curved profile in the longitudinal shaft section. The bearing surface 202 of the big end 201 is matched to the profile of the crank pin 102 and features a convex profile being in close contact with the concave profile of the crank pin 102.

The crankshaft 100 is formed as a single-piece and comprises main journals 101, crank pins 102 and webs 103 (FIG.

2). The main journals 101 define the axis of rotation 104 of the shaft. The webs 103 connect the main journals 101 and the crank pins 102 and may contain hollow sections 105, 106 if the crankshaft 100 is formed by casting. On a part of the webs 103, counter weights 107 are formed for compensating imbalance.

The crank pins 102 each feature a bearing surface 108 for a conrod 200. For reasons of clarity, only the outlines of a conrod 200 are shown by means of a dashed line in FIG. 2. The main journals 101 feature a bearing surface 110 for accommodation in an engine block bearing—not shown. The bearing surfaces 108, 110 of the crank pins 102 and main journals 101 in their load-bearing section that bears the forces acting on the crankshaft 100 feature a concavely curved profile in the longitudinal shaft section. The profiles of the crank pins 102 and main journals 101 are preferably determined according to the principle of constant stresses, such that in time average, i.e. in average over one complete engine firing cycle, an essentially uniform equivalent stress is distributed overall on the bearing surface. The crank pins 102 and main journals 101 formed according to the invention in comparison to a cylindrical pin feature an increase of material in the area of higher load. This leads to an increase of the fatigue strength of the crankshaft. The design optimisation can be carried out according to a method developed by Claus Mattheck "Design of Nature", $4^{th}$ Edition (2006) under the application of the Finite Elements Method. Also, approximation methods find application.

Figure 2:
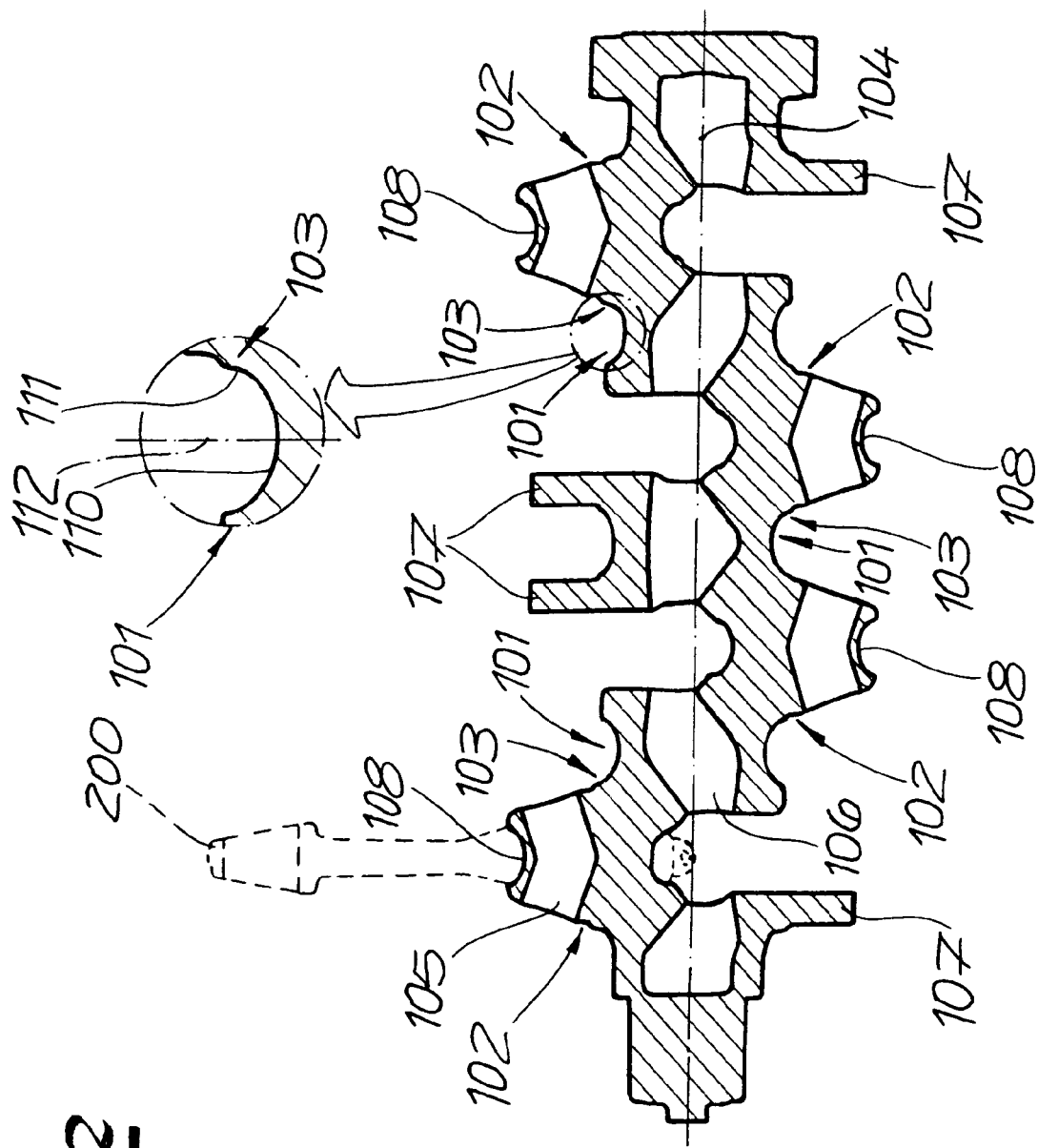

From the illustration in FIG. 2, one derives that the load-bearing areas of the bearing surfaces 108, 110 adjoin both sides with a continuous curvature to a bearing thrust face 111 of the webs 103. It is also apparent that the load-bearing area of the bearing surfaces 108, 110 features a continuously curved profile that is symmetrical to the bearing surface middle 112. The profile deviates from a circular form and can be described by means of a polynomial function of higher order.

The main journals 101 and crank pins 102 are conveniently optimised according to the principle of uniform distributed stresses independent of one another and as result of design optimisation; they feature different curvatures.

Figure 3:
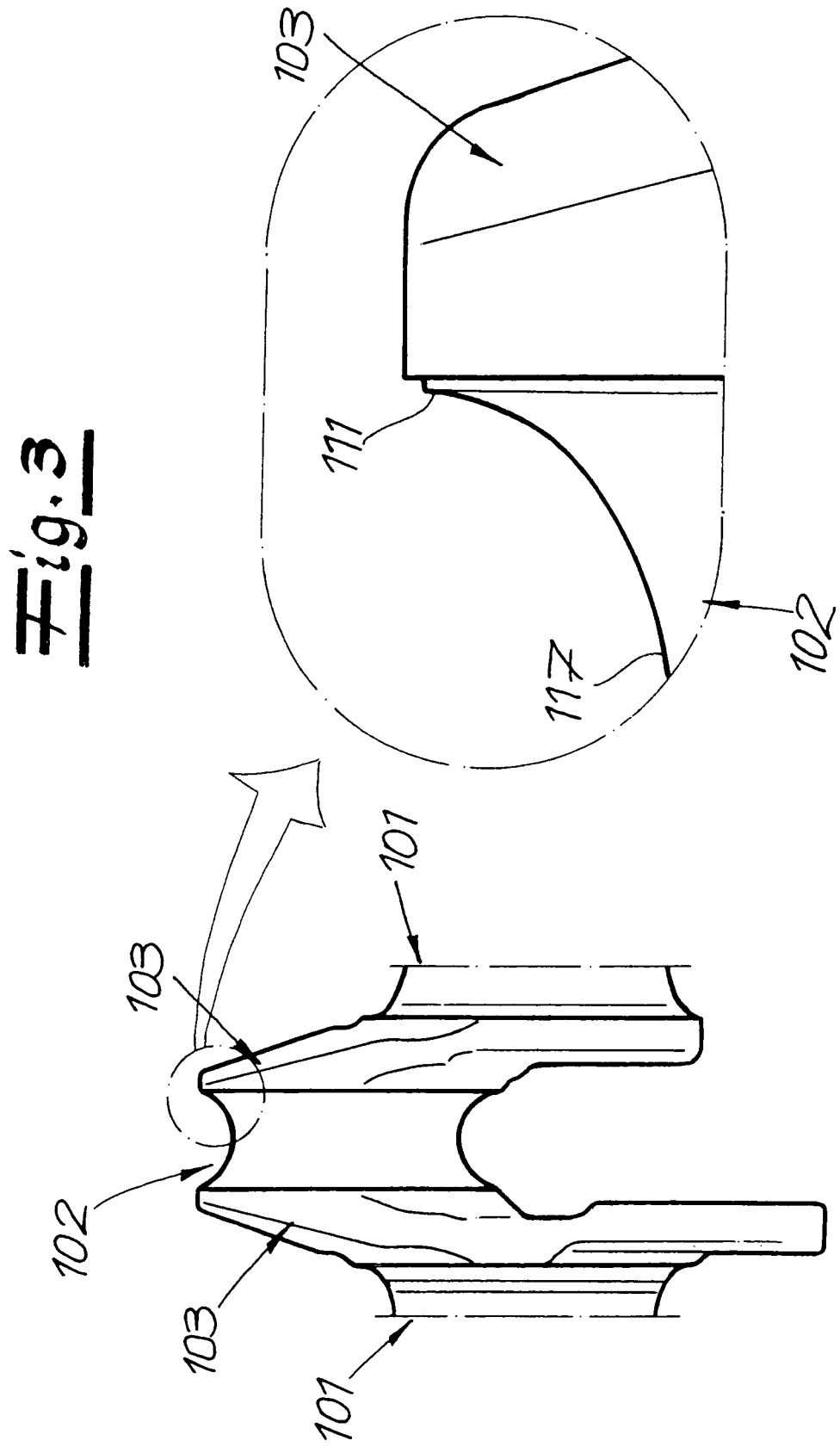
Figure 4:
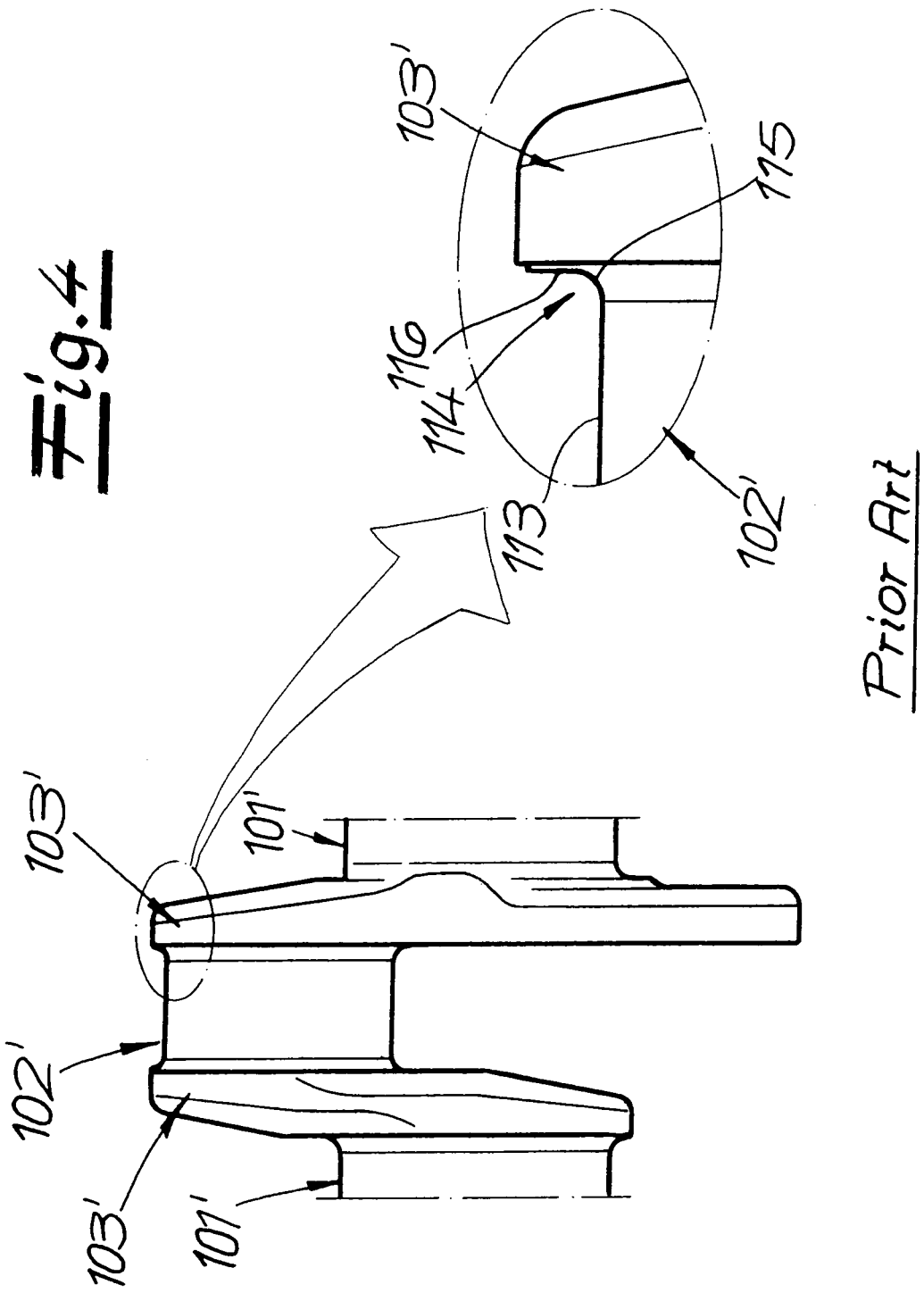

From a comparative look on FIG. 3, that illustrates the invention, and FIG. 4, respective 5, that show the prior art crankshaft, the basic principle of the invention becomes apparent. The crank pins 102' and the main journals 101' of a crankshaft formed according to the prior art (FIGS. 4 and 5) feature a cylindrical bearing surface 113. A small transition area 114 is attached to this cylindrical bearing surface 113 on both sides, comprising a curvature 115. The curvature 115 has basically a circular arc profile and a radius of a few millimeters. The curvature 115 forms the transition from the cylindrical bearing surface 113 to a sidewall 116 of the adjoining web 103' and is the key factor for the fatigue strength of the crankshaft. In the case of cast crankshafts the transition area 114 has to be work hardened by cold rolling. In the case of forged crankshafts the transition area featuring a radius can as well be finish machined by cold rolling in order to apply a work hardening for improving the fatigue strength. The sidewall 116 of the web adjoining to the curved transition area 114 serves as lateral guidance for the conrod.

Figure 5:
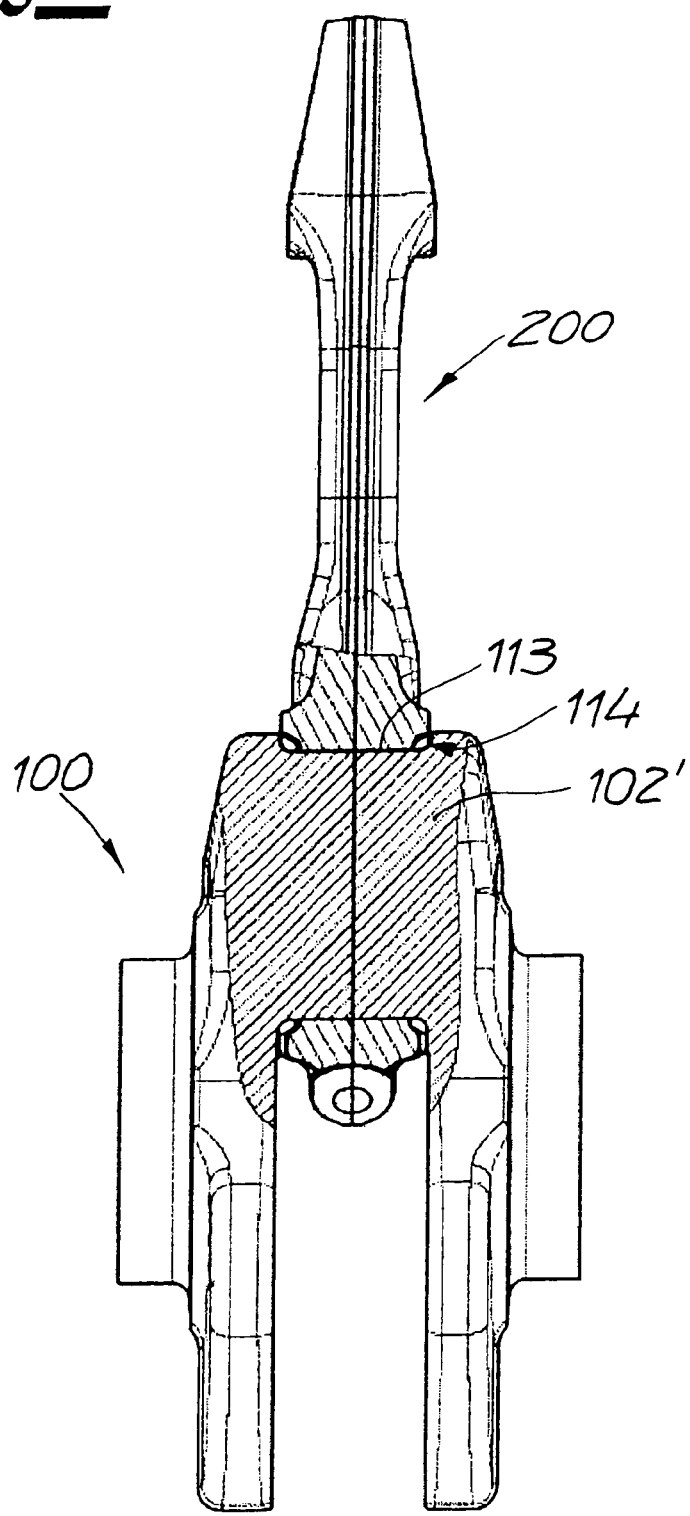

Comparing FIG. 3 with FIG. 4 respectively FIG. 5 it becomes apparent that the subject of the invention does not feature the transition area 114 that comprises the curvature 115. According to the invention the bearing surface 108 of the crank pins 102, as well as the bearing surface 110 of the main journals 101, is not formed cylindrically any more but comprises a steady curve progression with a concave curvature.

The contour 117 of the bearing surfaces 108, 110 steadily turns into a sidewall section of the webs 103, defining the bearing thrust face 111. Due to this, more material is present in the outer border area of the bearing surfaces 108, 110 than in the same area of a crankshaft according to prior art. This surplus of material results in a significant increase of the fatigue strength of the crankshaft. The invention teaches to specifically influence the area of the crankshaft relevant for and limiting the fatigue strength and to improve the fatigue strength of the crankshaft in this area by means of a constructive design modification. The bearing surfaces 110, 108 of the main journals 101 and the crank pins 102 designed according to the invention deviate from the principle of prior art to design the bearing surface segment cylindrically and to let it interact with a cylindrical bore of the big rod eye of the conrod or a cylindrical bearing shell of a crankshaft bearing.

A significant increase of fatigue strength is accomplished due to the invention without the utilisation of a special high-strength material or additional production steps for the enhancement of the fatigue strength. The design of the main journals 101 and the crank pins 102 according to the invention can result in an improvement of the strength of the crankshaft in the loaded areas of up to 30 to 50%.

Even in the case of increasing loads acting on the crankshaft due to a higher operating pressure of modern engines, a higher (stronger) material grade for the crankshaft is not needed. The invention is applicable to cast crankshafts as well as forged crankshafts. A subsequent work hardening by cold rolling is not necessary any longer.

The bearing surfaces 108, 110 of the crank pins 102 and/or of the main journals 101 can be induction-annealed or coated with hard materials by which the wear resistance of the bearing surfaces can be improved.

Figure 6A:
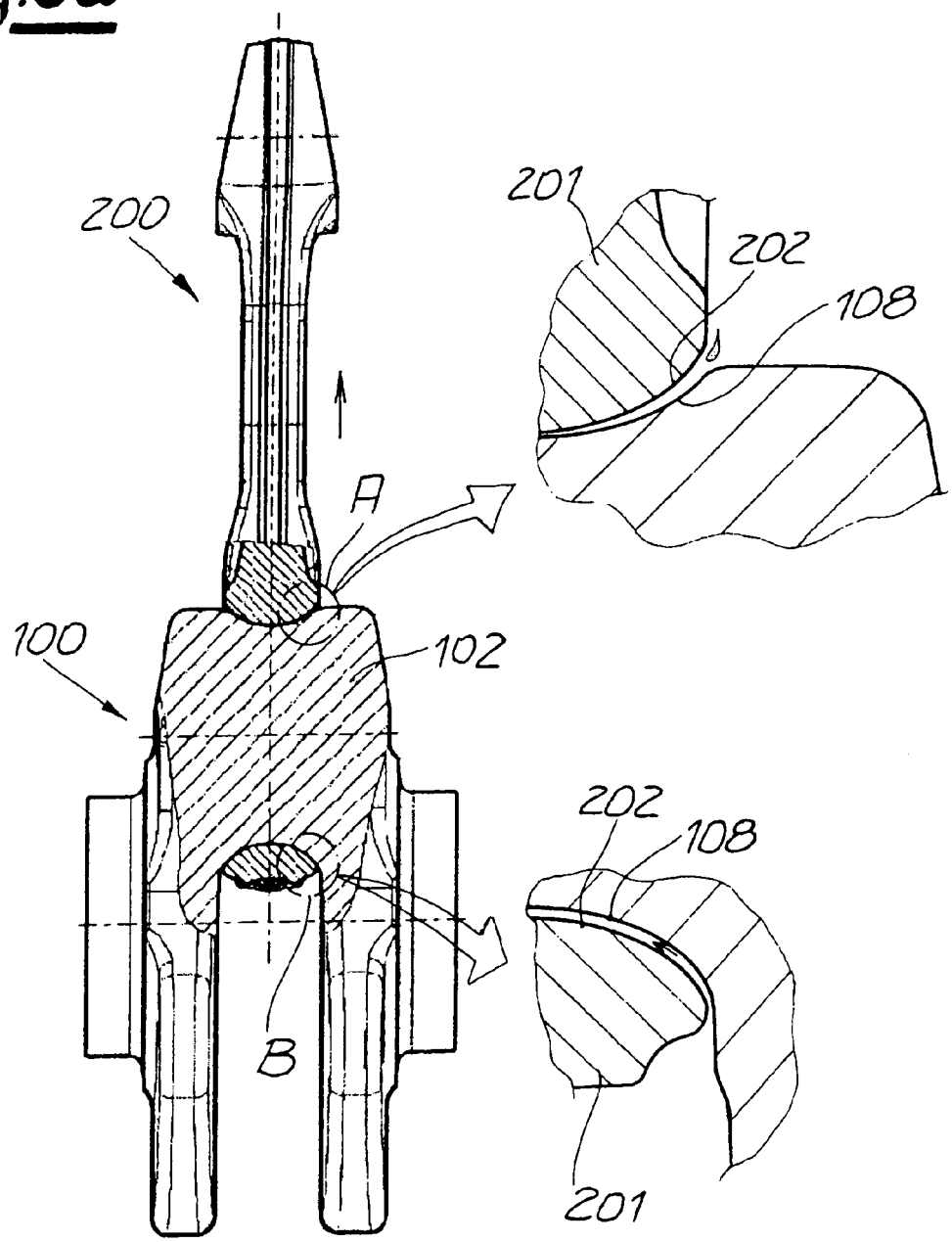

The big end 201 of the conrods 200 located on the crankshaft 100, as well as the engine block bearings, comprise bearing surfaces 202 that are matched to the contour of the crank pins 102 resp. the main journals 101. The concave curvature of the bearing surfaces 108, 110 according to the invention is also advantageous for oil lubrication between the bearing surface 108 of the crank pins resp. main journals and adjoining bearing surface 202 of the big end 201 of conrods 200 resp. engine block bearings. The effects which improve the oil lubrication are illustrated in FIGS. 6a and 6b.

When the crank drive is operated the crankshaft 100 works under tensile and compression strength due to the inertia and gas load effects. Under tensile and compression forces the crank pins 102 and the big ends 201 mounted thereon are deformed elastically such that small gaps of a few micrometers are opened and closed in the regions A and B illustrated in FIGS. 6a and 6b. When the throw of the conrod is under tensile region A is capturing the oil that drips from the piston after the jet oil flow has cooled and lubricated the piston pin region, while the region B works as a guiding for the connecting rod and also to pump the captured oil to the center of the crank pin 102. In FIG. 6b it is illustrated that when the throw is under compression the region A works as a guide for the conrod and also to pump oil to the center of the crank pin 102.

With a cylindrical design of the crank pins 102' and the main journals 101' and accordingly cylindrical bore in the big end resp. the engine block bearing, as it is realised according to the prior art shown in FIG. 4 and FIG. 5, this oil pump effect cannot be achieved. Therefore, lubrication of the bearing surface 108, 202 between crankshaft and conrod/engine block bearing is significantly improved by the invention and wear is reduced.

The invention claimed is:

1. A crank drive comprising:
a crankshaft having
main journals defining a crankshaft axis,
a plurality of crank pins each having a bearing surface with a concavely curved region in a longitudinal crankshaft section, and
webs extending radially from the crankshaft axis and connecting the crank pins to the main journals, the concavely curved region of each crank pin having a continuous concave curvature that extends into a sidewall section of the webs and defines a bearing surface; and
respective conrods each having a big end fitted to a respective one of the crank pins and having a bearing surface with a convexly shaped region symmetrical to a middle of the respective crank pin bearing surface and in contact with the concave region of the bearing surface of the respective crank pin in a load-bearing area that transmits forces acting between the big end of the respective conrod and the crank pin when the drive is in use, shapes of the bearing surfaces being in accordance with the principle of uniformly distributed stresses such that essentially the same stress is distributed overall in the bearing surfaces in time average.

2. The crank drive defined in claim 1, wherein the main journals have bearing surfaces with a concavely curved region in a longitudinal crank shaft section for accommodation in an engine block, the concavely curved bearing surface of each main journal having a continuous concave curvature that extends into a sidewall section of the webs defining a bearing thrust surface, the main journals and the crank pins being optimized according to the principle of uniform stresses independent of one another and as a result of design optimization having different curvatures.

3. The crank drive defined in claim 1, wherein the main journals and the crank pins are hollow when cast.

4. The crank drive defined in claim 1, further comprising:
counter weights formed on the webs for compensation of imbalances.

5. The crank drive defined in claim 1, wherein the bearing surfaces have a continuously curved profile that is symmetrical to middles of the bearing surface.

6. The crank drive defined in claim 5, wherein the symmetrical sections of the profile can be described by means of a polynomial function of higher order.

7. A crank drive comprising:
a crank shaft having
main journals defining a crankshaft axis,
a plurality of crank pins each having a bearing surface with a concavely curved region in a longitudinal crankshaft section, and
webs extending radially from the crankshaft axis and connecting the crank pins to the main journals, the concavely curved region of each crank pin having a continuous concave curvature that extends into a sidewall section of the webs and defines a bearing surface; and
respective conrods each having a big end fitted to a respective one of the crank pins and having a bearing surface with a convexly shaped region symmetrical to a middle of the respective crank pin bearing surface and in contact with the concave region of the bearing surface of the respective crank pin in a load-bearing area that transmits forces acting between the big end of the respective conrod and the crank pin when the drive is in use, shapes of the bearing surfaces being in accordance with the principle of uniformly distributed stresses such that essentially the same stress is distributed overall in the bearing surfaces in time average, the convex and concave bearing surfaces further having an oil-pumping action in that under tensile and compression forces acting on the crank shaft when the drive is operated the crank pins and the big ends are deformed elastically such that small gaps of a few micrometers are opened and closed between the bearing surfaces to move oil between the cooperating convex and concave bearing surfaces.

8. A crank drive comprising:
a crank shaft having
main journals defining a crankshaft axis and having main journals have bearing surfaces with a concavely curved region in a longitudinal crank shaft section for accommodation in an engine block,
a plurality of crank pins each having a bearing surface with a concavely curved region in a longitudinal crankshaft section, the main journals and the crank pins being optimized according to the principal of uniform stresses independent of one another and as a result of design optimization having different curvages, and
webs extending radially from the crankshaft axis and connecting the crank pins to the main journals, the concavely curved region of each crank pin having a continuous concave curvature that extends into a sidewall section of the webs and defines a bearing surface, the concavely curved bearing surface of each main journal having a continuous concave curvature that extends into a side wall section of the webs defining a bearing thrust surface; and
respective conrods each having a big end fitted to a respective one of the crank pins and having a bearing surface with a convexly shaped region symmetrical to a middle of the respective crank pin bearing surface and in contact with the concave region of the bearing surface of the respective crank pin in a load-bearing area that transmits forces acting between the big end of the respective conrod and the crank pin when the drive is in use, the curved profiles of the bearing surfaces having a pumping effect for lubrication between the bearing surfaces of the crank pins and the journal bearing surface of the big end of the conrods and between the bearing surface of the main journals and a journal bearing surface of the engine block bearings as the result of operating displacements and elastic deformations of the crank drive between convex and concave bearing surfaces when the drive is operated.

* * * * *